(12) United States Patent
Schiel

(10) Patent No.: US 8,492,940 B2
(45) Date of Patent: Jul. 23, 2013

(54) APPARATUS FOR HOLDING AN ELECTRICAL MACHINE SUCH THAT IT IS DECOUPLED FROM VIBRATION

(75) Inventor: Andreas Schiel, Gernsbach-Lautenbach (DE)

(73) Assignee: Robert Bosch GmbH, Stuttgart (DE)

( * ) Notice: Subject to any disclaimer, the term of this patent is extended or adjusted under 35 U.S.C. 154(b) by 471 days.

(21) Appl. No.: 12/934,847

(22) PCT Filed: Oct. 31, 2007

(86) PCT No.: PCT/EP2007/061760
§ 371 (c)(1),
(2), (4) Date: Jan. 13, 2011

(87) PCT Pub. No.: WO2008/080669
PCT Pub. Date: Jul. 10, 2008

(65) Prior Publication Data
US 2011/0101800 A1    May 5, 2011

(30) Foreign Application Priority Data

Dec. 27, 2006 (DE) .......................... 10 2006 061 582

(51) Int. Cl.
*H02K 5/24* (2006.01)
(52) U.S. Cl.
USPC ............................................... 310/51; 310/89

(58) Field of Classification Search
USPC ................................................ 310/51, 89, 91
See application file for complete search history.

(56) References Cited

U.S. PATENT DOCUMENTS

| | | | |
|---|---|---|---|
| 2,881,995 A * | 4/1959 | Neher ............................ | 248/604 |
| 6,927,508 B1 | 8/2005 | Rupp et al. | |
| 7,566,998 B2 | 7/2009 | Winkler et al. | |
| 7,679,233 B2 * | 3/2010 | Winkler et al. ................. | 310/51 |
| 2004/0135439 A1 * | 7/2004 | White ............................ | 310/51 |
| 2006/0125330 A1 * | 6/2006 | Winkler et al. ................. | 310/51 |
| 2007/0159013 A1 * | 7/2007 | Maruyama et al. ............. | 310/51 |

FOREIGN PATENT DOCUMENTS

| | | |
|---|---|---|
| DE | 43 21 633 | 1/1995 |
| DE | 103 26 996 | 1/2005 |
| WO | WO 01/18424 | 3/2001 |
| WO | WO 2004/112219 | 12/2004 |

* cited by examiner

*Primary Examiner* — Thanh Lam
(74) *Attorney, Agent, or Firm* — Merchant & Gould P.C.

(57) ABSTRACT

The invention relates to an apparatus for holding an electrical machine (1) such that it is decoupled from vibration, which electrical machine (1) has a pole housing (3) and a machine flange, between which at least one vibration-decoupling element (7) is arranged, which rests on at least one contact surface (11) of the pole housing (3) and/or motor flange (4) and has a shape similar to a sphere, at least in places. The invention provides for the shape of the contact surface (11) to be matched to the shape which is similar to a sphere.

6 Claims, 3 Drawing Sheets

APPARATUS FOR HOLDING AN ELECTRICAL MACHINE SUCH THAT IT IS DECOUPLED FROM VIBRATION

This application is a National Stage Application of PCT/EP2007/061760, filed 31 Oct. 2007, which claims benefit of Serial No. 10 2006 061 582.4, filed 24 Dec. 2006 in Germany and which applications are incorporated herein by reference. To the extent appropriate, a claim of priority is made to each of the above disclosed applications.

The invention relates to an apparatus for holding an electrical machine such that it is decoupled from vibration.

TECHNICAL FIELD

Electrical machines are used in all areas of daily life. They can be used virtually anywhere particularly as electric motors. When starting an electrical machine and during the operation thereof, vibrations occur which require the electrical machine to be decoupled from the support thereof, respectively from the surrounding environment thereof. Particularly in the case of electric motors as they are used, for example, in fans of heating and air conditioning systems of motor vehicles, vibration decouplings are known for preventing or at least reducing the transmission of structure-borne noise of the motor, respectively the fan unit, to the chassis and/or to the interior of the vehicle. Operation noise of the electric motor and vibrations resulting from operation, for example those produced from the unbalance of an impeller to be driven, are thereby transmitted to a great degree to the housing, respectively to the housing cover, of the electric motor and lead to an undesirable development of noise if they are not damped. Conventional methods for securing motors of this kind consist of encapsulating the complete motor, for instance by inserting said motor in a plastic housing or one made of metal, whereupon a flange is provided for the connection to the surrounding environment thereof. In so doing, decoupling elements, for instance from rubber, are inserted between motor and motor housing, respectively in the flange, to dampen the excitation of vibrations. Particularly in regions, in which the electric motor has to be supported, this action leads to a conflict in objectives resulting from the fact that supporting the motor requires a relatively solid or even rigid fixing thereof and the damping of vibrations on the other hand requires elasticity. As a rule, these mutually exclusive requirements are dealt with by the use of preloaded decoupling elements. The damping of the vibrations thereby results from the flexing work in the decoupling elements, whereby an optimal decoupling is not possible.

From the German patent publication DE 103 26 996 A1, a method is known for attaching the decoupling elements to fixing means which are integrally configured with at least one pole ring of a pole housing of the electric motor. In this way, an attachment and simultaneous decoupling of the motor can be achieved with respect to the motor flange as well as to parts of the motor housing. The disadvantages of this are that the installation position of a motor of this kind has to be chosen in accordance with the arrangement of the motor elements and that an undesirable setting behavior occurs during the course of operation of the electric motor. Said setting behavior leads to undesirable reductions in clearances or to moving elements coming in contact with fixed elements, i.e. a fan blade contacting a housing, and to an impairment of the damping performance.

It is the aim of the invention to provide an apparatus for holding an electrical machine such that it is decoupled from vibration, which allows these disadvantages to be avoided.

While providing good levels of vibration damping, the aim of the inventive apparatus is furthermore to offer a reliable attachment and at the same time avoid settling behaviors of the electrical machine relative to the motor flange and/or housing to the greatest possible extent.

SUMMARY

In order to meet the aim stated above, an apparatus for holding an electrical machine such that it is decoupled from vibration is proposed, said electrical machine having a pole housing and a machine flange, between which at least one vibration-decoupling element is arranged, which rests on at least one contact surface of the pole housing and/or motor flange and has a shape similar to a sphere, at least in places. The invention provides for the shape of the contact surface to be matched to the shape which is similar to a sphere.

The sufficiently reliable fixing of the individual parts to be decoupled, i.e. particularly the pole housing and the motor flange, respectively the motor housing, could only be achieved in the technical field by a preloading of the vibration decoupling elements. This preloading had to be so strong that said vibration decoupling elements were able by frictional contact to absorb the weight and/or kinetic energy of the motor particularly during start-up and as a result of the ensuing torque without an undesirably large relative motion of these parts with respect to each other having taken place. As soon as the installation position was changed, as is possible, for example, as a result of construction changes in a vehicle wherein the electric motor is installed or occurs at the request of the user, this friction fit was frequently not sufficient to permanently prevent a shifting of the individual components of the electrical machine, in particular a shifting of the relatively heavy pole housing with respect to the motor flange and/or motor housing parts. According to the invention, said shifting is prevented as a result of the shape of the contact surfaces of the pole housing and/or motor flange, on which the vibration-decoupling element rests, being configured at least in places so as to be matched to the spheroidal shape of said vibration-decoupling element. Consequently, not only a friction fit but a positively-locking fit is achieved at least in places between said vibration-decoupling element and said pole housing and/or motor flange. This means that not only can an exactly defined position of pole housing and/or motor flange to said vibration-decoupling element be constructionally assumed and maintained but also in particular that said vibration-decoupling element does not have to be unnecessarily preloaded, whereby the vibration-decoupling properties of said vibration-decoupling element are furthermore improved.

In an exemplary embodiment, the invention provides for the vibration-decoupling element to consist of elastic material. In one embodiment of said vibration-decoupling element consisting of elastic material, e.g. rubber or an elastic plastic, the vibration-decoupling properties can be varied to a great degree and adapted to the respective requirements of the electrical machine to be decoupled, in particular to the expected frequency spectrum thereof to be damped. By suitable selection and arrangement of elastic vibration-decoupling elements, undesired resonances can be avoided as far as possible in a plurality of ranges.

In a preferred embodiment, the vibration-decoupling element has two spheroidal formations, which are connected to each other via a web. The vibration-decoupling element is as a result configured in the shape of a dumbbell, the spheroidal formation being disposed on both ends of a web. The web allows said vibration-decoupling element to be placed, for example, into fastening lugs in a very simple manner and thereby to connect said element to the pole housing, the machine flange or to a housing component of the electrical machine. Said vibration-decoupling element can, for example, be clipped into the fastening lugs; thus enabling a very simple and cost effective assembly, which furthermore can be configured in a self-retaining manner by the web being sized small relative to the strength of the fastening lug; thus enabling the spheroidal formations to clamp on both sides.

In a particularly preferred embodiment, the invention provides for both spheroidal formations to rest on contact surfaces of the pole housing and/or machine flange, the shapes of said contact surfaces being matched to those of the spheroidal formations. Provision is particularly made here for the one spheroidal formation to rest on contact surfaces of the pole housing whose shapes are matched thereto and for the other to rest on a machine flange or for both spheroidal formations to rest in each case on contact surfaces of said pole housing and/or said machine flange whose shapes are matched thereto. It is therefore possible to have the one spheroidal formation rest only on a contact surface of said pole housing whose shape is matched thereto and the other to rest only on a contact surface of said machine flange whose shape is matched thereto, or to have a spheroidal formation rest on contact surfaces whose shapes are matched thereto of only one of these two components the other, however, to rest on said contact surfaces of two of these components.

In another, particularly preferred embodiment, the electrical machine has a housing cover, which bears on the vibration-decoupling element with a contact surface. In so doing, not only is the vibration-decoupling of the pole housing with respect to the machine flange achieved but also with respect to the housing cover of said electrical machine so that no undesired vibrations or even resonances are conveyed via said housing cover or carried into said electrical machine. For this reason, said housing cover has a contact surface, which comes in contact with said vibration decoupling element and bears thereupon.

In another most particularly preferred embodiment, the invention provides for the shape of the contact surface to be matched to the spheroidal shape of the vibration-decoupling element. The shape of the contact surface, which serves to support the housing cover on said vibration-decoupling element, is then likewise matched to the spheroidal shape of said vibration-decoupling element in the same manner as the contact surfaces, with which the motor flange or the pole housing are supported. In this way, a fixed insertion and positioning of the decoupling element is ensured between all of the stated components. In so doing, no or in any case no excessive preloading is required; thus enabling said vibration-decoupling element to utilize its vibration damping properties across virtually the entire frequency range which occurs. A relative displacement of the stated individual components, i.e. particularly of the pole housing, the motor flange and the housing cover with respect to each other, which could result from a shifting, respectively sliding, of these components on said vibration-decoupling element, is virtually completely avoided in a reliable manner as a result of the components being in contact with said vibration-decoupling element not merely by means of frictional connection but in a positive-locking manner.

Additional advantageous embodiments result from the sub-claims and from combinations of the same.

BRIEF DESCRIPTION OF THE DRAWINGS

The invention is subsequently described in detail with the aid of the drawings.

For this purpose, the following are shown.

DETAILED DESCRIPTION

Figure 1:
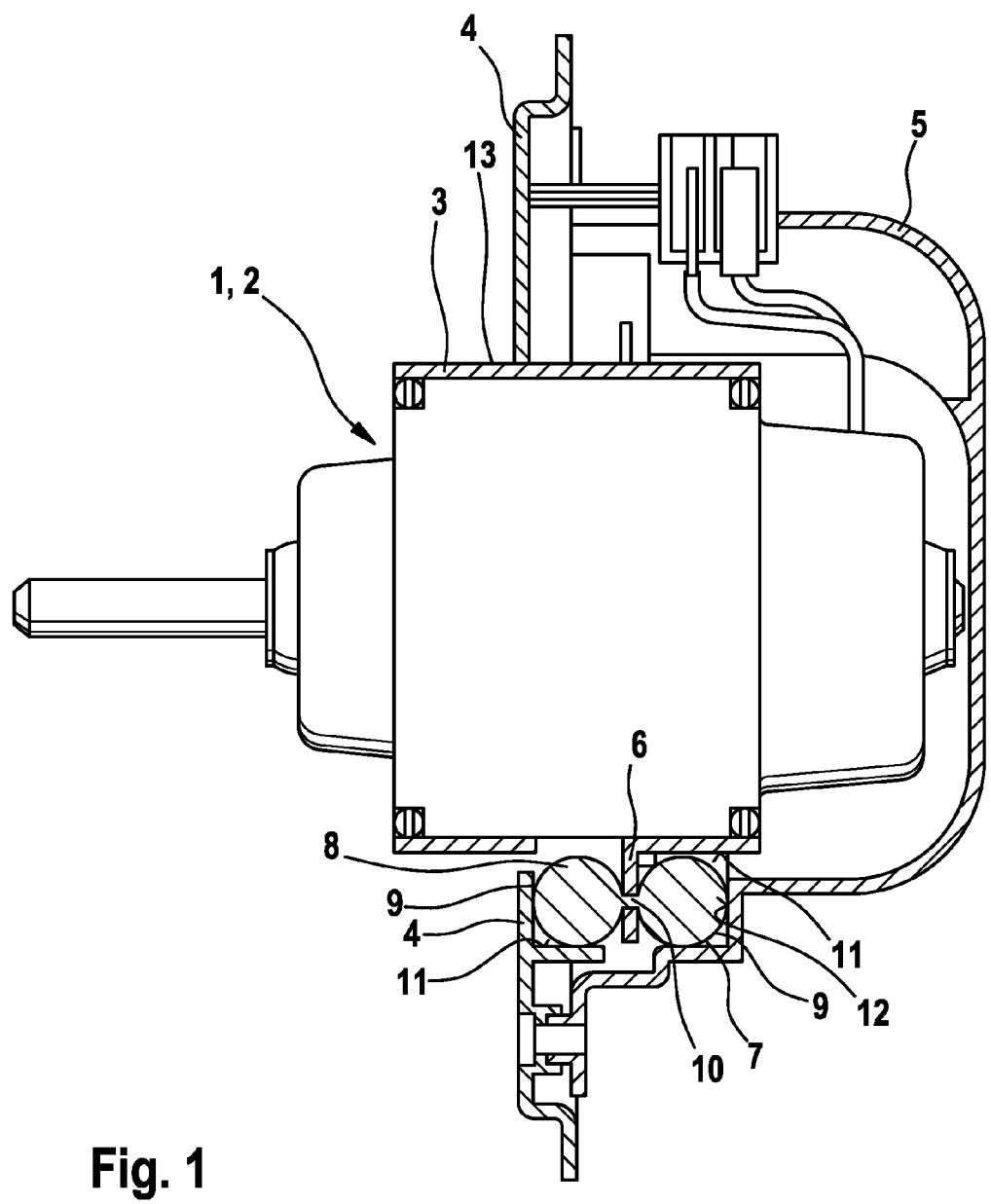
FIG. 1 an electrical machine in installation position with vibration-decoupling elements, FIG. 2 a vibration-decoupling element with contact surfaces, the shapes of which are matched to the shape of said vibration-decoupling element, and FIG. 3 a housing cover with contact surfaces.

FIG. 1 shows an electrical machine 1, namely an electric motor 2 having a pole housing 3. The electric motor 2 is enclosed and held by a motor flange 4 and is surrounded by a housing cover 5, which is placed over said electric motor 2 and rests on the motor flange 4. Fastening lugs 6, only one of which is visibly depicted here, are radially configured on the pole housing 3. The fastening lugs 6 are in particular integrally configured with the pole housing 3, for example in the course of a punching/embossing process. These fastening lugs have a recess, in which a vibration-decoupling element 7 is inserted, which is configured in the form of a dumbbell 8, said dumbbell consisting of two spheroidal formations 9 which are connected to each other by means of a web 10. The web 10 is inserted into the stated recess of the fastening lug 6; thus enabling the spheroidal formations 9 to come to rest on both sides of the fastening lug 6. One of said spheroidal formations 9 is supported on a contact surface 11 of the pole housing 3 and on a contact surface 12 of the housing cover 5, whereas the other is supported on a contact surface 11 of the motor flange 4.

The figure is merely supposed to depict the positioning of the vibration-decoupling elements 7 in relation to the individual components of the electric motor 2, in particular in relation to the pole housing 3, the motor flange 4 and the housing cover 5. The configuration of the contact surfaces 11 and the contact surfaces 12 is in this instance not yet of significance. Contrary to the depiction, said electric motor 2 is held and damped by a plurality of vibration-decoupling elements 7. These can, for example, be distributed in a symmetrical or asymmetrical arrangement around an outer circumference of said pole housing 3.

Figure 2:
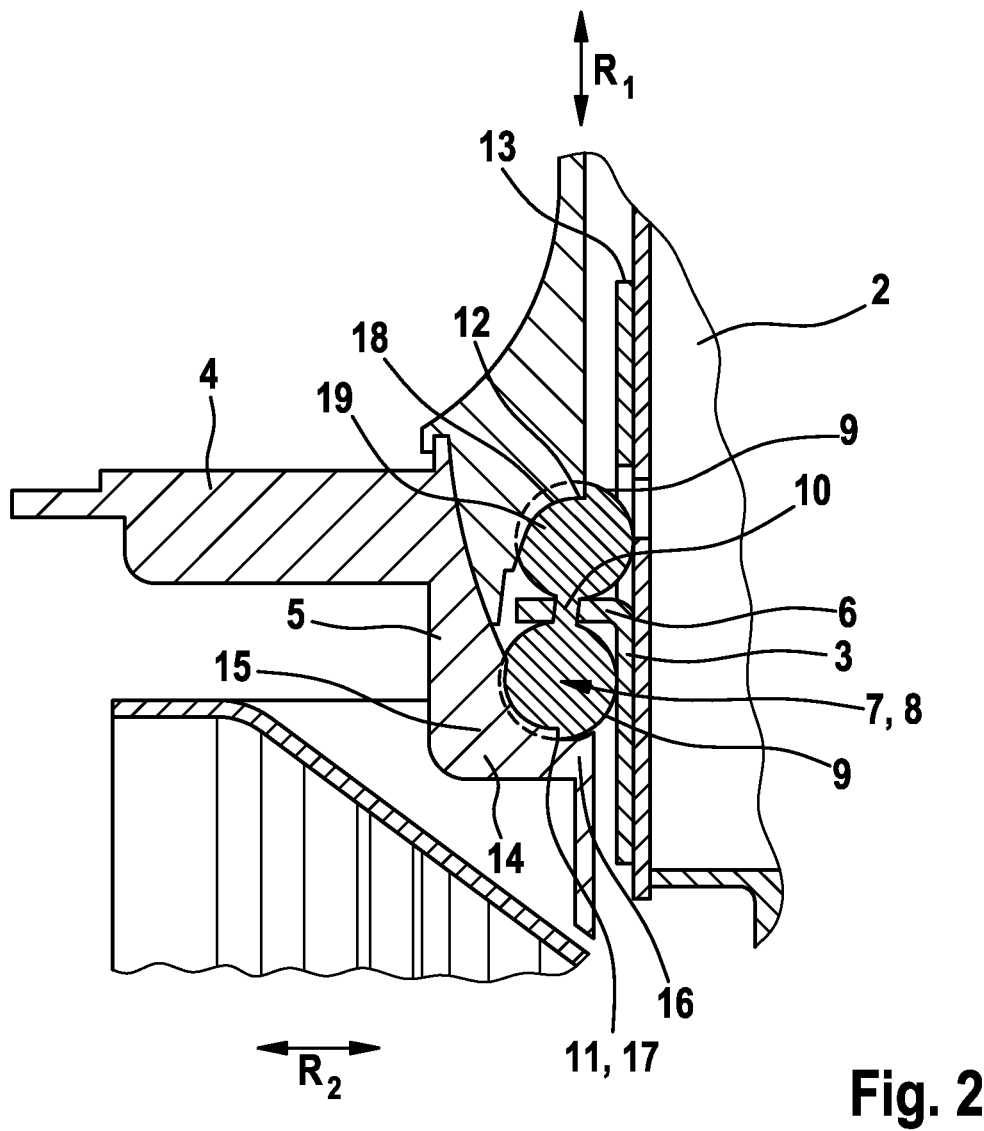

FIG. 2 shows a detail of an apparatus according to the invention for holding an electrical machine such that it is decoupled from vibration. The vibration-decoupling element 7 is in this case again configured as a dumbbell 8, the web 10 being inserted in a fastening lug 6 configured on the pole housing 3 of the electric motor 2 so that the spheroidal formations 9 of said vibration-decoupling element 7 lie on both sides of the fastening lug 6 (in axial extension of the motor). The electric motor 2 is encompassed by the motor flange 4, which has a rim design 14, which surrounds the periphery in an annular manner and in which the housing cover 5 having a lap jointed edge 15 is inserted and thus is placed over said electric motor 2. The motor flange 14 has in the lower region 16 thereof a supporting surface 17, the shape of which is matched to the shape of the spheroidal formation 9. The supporting surface 17 thus constitutes the shape-adapted contact surface 11 on the motor flange, the shape of which is adapted to the shape of the outer contour of said spheroidal formation 9. On the substantially opposite side (as seen in the axial extension of the dumbbell 8), the housing cover 5 includes the contact surface 12, the shape of which is likewise matched to the shape of said outer contour of said spheroidal formation 9, and hereby forms the housing cover supporting surface 18. The shape adaptation substantially takes place such that the contact surface 11, respectively the contact surface 12, has a rounded recess having a radius, which approximately corresponds to the said speheroidal formation 9. In this way, it is possible for said contact surface 11, respectively said contact surface 12, to be supported across a relatively extensive region of said spheroidal formation 9 and not merely to have a substantially almost linear expansion or a small two-dimensional expansion resulting only from deformation of said spheroidal formation 9 as is the case in a known planar embodiment from the technical field. In this way, a friction fit is not merely achieved between the contact surface and the respectively associated spheroidal formation 9 but also a positive-locking fit, which prevents a relative motion of said electric motor 2 with respect to the housing cover 5, respectively the motor flange 4, in the direction of the arrow $R_1$ as well as an excessive relative motion in the direction of the arrow $R_2$. Nevertheless a slight movement of the electric motor 1 in relation to the housing cover 5 and particularly in relation to the motor flange 4 is possible, especially when the motor is starting up and as a result a torque occurs between said electric motor and said motor flange 5. This relative motion, which is imparted by the outer circumference 13 of the pole housing and occurs around the motor axis, is absorbed by the vibration damping element 7, which consists of elastic material 19 and acts in a restorative manner with respect to this torque. No significant reduction in the existing component clearances in the radial direction, however, occurs.

Figure 3:
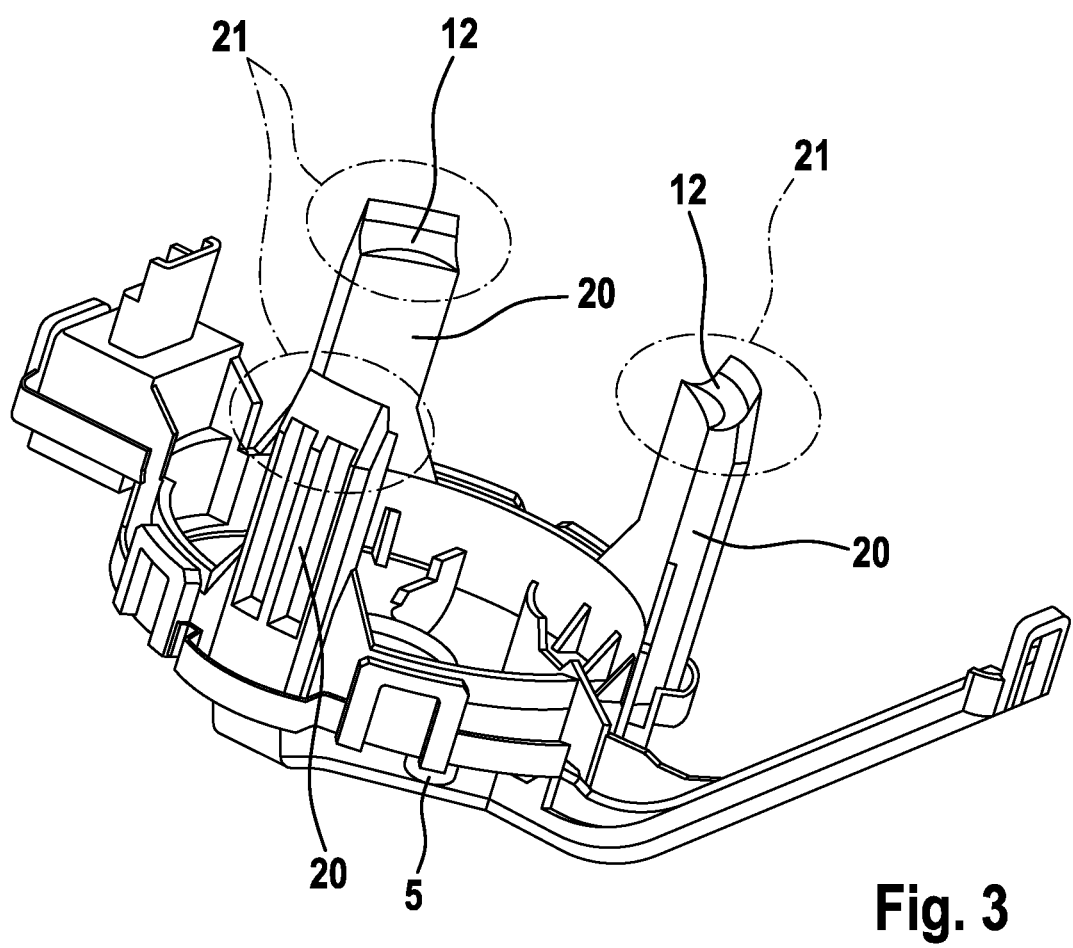

FIG. 3 shows a housing cover 5 for the non-depicted electric motor 2, having contact surfaces 12 according to the invention, the ends of which are arranged in each case on cover supports 20. The cover supports 20 encompass the non-depicted electric motor 2, in particular the non-depicted pole housing 3, and rest with the contact surfaces 12 on the non-depicted spheroidal formations 9 while forming support regions 21 at their ends. Altogether three non-depicted vibration-decoupling elements 7, which are supported in each case by a spheroidal formation 9 on the contact surface 12, are configured across the circumference of the non-depicted electric motor 2. For this purpose, said contact surface 12 is not evenly designed but accommodates the outer contour of the spheroidal formations 9 described in the previous figures such that an extensive enclosure particularly toward the spheroid circumference of the spheroidal formations 9 is provided. In this way, the housing cover 5 is prevented from experiencing an axial or radial movement relative to said spheroidal formations 9 to a degree for which the vibration-decoupling element 7 (cf. previous figures) is not intended. Said electric motor 2, which is attached to said housing cover 5 via the previously described vibration-decoupling elements 7, is likewise prevented from experiencing an undesirably large movement in relation to said housing cover 5, for example as a result of setting properties due to the dead weight thereof when fitted to the corresponding installation position. Said movement could not alone be prevented merely by means of a friction fit between a spheroidal formation 9, as previously described, and the contact surface 12. The positive-locking fit with the spheroidal formation 9, which was achieved by the shape-adapted configuration of said contact surface 12 allows in contrast a reliable and clear-cut as well as effective positioning of said housing cover 5 over the cover supports 20 relative to the non-depicted spheroidal formations 9 (as described in detail with regard to the previous figures).

Altogether a very good vibration damping results and a significantly better long-term behavior result, particularly with regard to subsidence formations of the electric motor 2 due to installation positions.

The invention claimed is:

1. Apparatus for holding an electrical machine such that it is decoupled from vibration, which electrical machine has a pole housing and a machine flange, between which at least one vibration-decoupling element is arranged, which rests on at least one contact surface of the pole housing and/or motor flange and has a shape similar to a sphere, at least in places, wherein the shape of at least one of the contact surfaces is matched to the shape which is similar to a sphere.

2. Apparatus according to claim 1, wherein the vibration-decoupling element consists of elastic material.

3. Apparatus according to claim 1, wherein the vibration-decoupling element has two spheroidal formations, which are connected to each other via a web.

4. Apparatus according to claim 3, wherein both spheroidal formations rest on contact surfaces of the pole housing and/or machine flange, the shape of at least one of the contact surfaces being matched thereto.

5. Apparatus according to claim 1, wherein the electrical machine has a housing cover, which bears on the vibration-decoupling element with a contact surface.

6. Apparatus according to claim 5, wherein the vibration-decoupling element comprises a spheroidal shape and wherein the shape of the contact surface of the housing cover is matched to the spheroidal shape of the vibration-decoupling element.

* * * * *